US010293466B2

(12) United States Patent
Haas et al.

(10) Patent No.: US 10,293,466 B2
(45) Date of Patent: May 21, 2019

(54) STRUCTURED ABRASIVE ARTICLES AND METHODS OF USING THE SAME

(71) Applicant: 3M INNOVATIVE PROPERTIES COMPANY, St. Paul, MN (US)

(72) Inventors: John D. Haas, Roseville, MN (US); Negus B. Adefris, Woodbury, MN (US); Scott R. Culler, Burnsville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 38 days.

(21) Appl. No.: 15/033,848

(22) PCT Filed: Nov. 4, 2014

(86) PCT No.: PCT/US2014/063841
§ 371 (c)(1),
(2) Date: May 2, 2016

(87) PCT Pub. No.: WO2015/073258
PCT Pub. Date: May 21, 2015

(65) Prior Publication Data
US 2016/0279762 A1    Sep. 29, 2016

Related U.S. Application Data

(60) Provisional application No. 61/902,947, filed on Nov. 12, 2013.

(51) Int. Cl.
*B24D 3/00* (2006.01)
*B24D 11/00* (2006.01)
(Continued)

(52) U.S. Cl.
CPC ............. *B24D 7/18* (2013.01); *B24D 7/06* (2013.01); *B24D 11/00* (2013.01);
(Continued)

(58) Field of Classification Search
USPC .............................. 51/298, 293, 307, 308, 309
See application file for complete search history.

(56) References Cited

U.S. PATENT DOCUMENTS

| 4,652,274 A | 3/1987 | Boettcher |
| 4,751,138 A | 6/1988 | Tumey |

(Continued)

FOREIGN PATENT DOCUMENTS

| CN | 102159361 A | 8/2011 |
| CN | 102862128 A | 1/2013 |

(Continued)

OTHER PUBLICATIONS

International Search report for PCT International Application No. PCT/US2014/063841 dated Feb. 24, 2015, 5 pages.

*Primary Examiner* — James E McDonough
(74) *Attorney, Agent, or Firm* — Bradford B. Wright

(57) ABSTRACT

Structured abrasive articles include a backing and shaped abrasive composites secured to the backing. The shaped abrasive composites include abrasive grits dispersed in a binder matrix. The shaped abrasive composites include a bottom surface and a top surface opposite and not contacting the bottom surface, and at least three sidewalls abutting both the bottom and top surfaces and two other sidewalls. In one embodiment, at least two cusps are formed by the top surface and individual sidewalls. In another embodiment, the top surface includes at least two triangular facets that contact at least two respective sidewalls and at least two cusps. The top surface includes at least one interior recessed portion nearer the cusps than the bottom surface. Methods of abrading a workpiece using the structured abrasive article are also disclosed.

9 Claims, 8 Drawing Sheets

(51) Int. Cl.
  *B24D 18/00* (2006.01)
  *C09K 3/14* (2006.01)
  *B24D 7/18* (2006.01)
  *B24D 7/06* (2006.01)
  *B24D 3/02* (2006.01)

(52) U.S. Cl.
  CPC ........ *B24D 18/0009* (2013.01); *C09K 3/1409* (2013.01); *C09K 3/1436* (2013.01); *B24D 2203/00* (2013.01)

(56) References Cited

U.S. PATENT DOCUMENTS

| | | | |
|---|---|---|---|
| 4,903,440 A | 2/1990 | Larson |
| 4,985,340 A | 1/1991 | Palazzotto |
| 5,086,086 A | 2/1992 | Brown-Wensley |
| 5,152,917 A | 10/1992 | Pieper |
| 5,236,472 A | 8/1993 | Kirk |
| 5,251,802 A | 10/1993 | Bruxvoort |
| 5,254,194 A | 10/1993 | Ott |
| 5,304,223 A | 4/1994 | Pieper |
| 5,376,428 A | 12/1994 | Palazzotto |
| 5,378,251 A | 1/1995 | Culler |
| 5,385,954 A | 1/1995 | Palazzotto |
| 5,435,816 A | 7/1995 | Spurgeon |
| 5,454,844 A | 10/1995 | Hibbard |
| 5,500,273 A | 3/1996 | Holmes |
| 5,549,962 A | 8/1996 | Holmes |
| 5,672,097 A | 9/1997 | Hoopman |
| 5,672,186 A | 9/1997 | Chesley |
| 5,681,217 A | 10/1997 | Hoopman |
| 5,833,724 A | 11/1998 | Wei |
| 5,851,247 A | 12/1998 | Stoetzel |
| 5,863,306 A | 1/1999 | Wei |
| 5,908,476 A | 6/1999 | Nishio |
| 6,048,375 A | 4/2000 | Yang |
| 6,139,594 A | 10/2000 | Kincaid |
| 6,293,980 B2 | 9/2001 | Wei |
| 6,319,108 B1 | 11/2001 | Adefris |
| 6,458,018 B1 | 10/2002 | Goers |
| 6,702,650 B2 | 3/2004 | Adefris |
| 7,410,413 B2 | 8/2008 | Woo |
| 7,494,519 B2 | 2/2009 | Fletcher |
| 7,553,346 B2 | 6/2009 | Welygan |
| 7,594,845 B2 | 9/2009 | Lugg |
| 8,038,750 B2 | 10/2011 | Pribyl |
| 8,080,073 B2 | 12/2011 | David |
| 8,083,820 B2 | 12/2011 | Kollodge |
| 8,348,723 B2 | 1/2013 | Woo |
| 8,425,278 B2 | 4/2013 | Culler |
| 2001/0041511 A1 | 11/2001 | Lack |
| 2003/0022604 A1 | 1/2003 | Annen |
| 2003/0143938 A1 | 7/2003 | Braunschweig |
| 2006/0147177 A1 | 7/2006 | Jing |
| 2007/0128991 A1 | 6/2007 | Yoon |
| 2007/0243798 A1 | 10/2007 | Annen |
| 2011/0021114 A1 | 1/2011 | McArdle |
| 2011/0053460 A1* | 3/2011 | Culler ................. B24D 11/00 451/28 |
| 2012/0167481 A1* | 7/2012 | Yener ................. C09K 3/1409 51/308 |
| 2012/0227333 A1 | 9/2012 | Adefris |
| 2013/0040537 A1 | 2/2013 | Schwabel |
| 2013/0065490 A1 | 4/2013 | Landin |
| 2013/0125477 A1 | 5/2013 | Adefris |

FOREIGN PATENT DOCUMENTS

| | | |
|---|---|---|
| EP | 0745020 | 12/1996 |
| KR | 10-2002-0029075 | 4/2002 |
| WO | WO 92-13680 | 8/1992 |
| WO | WO 98-03306 | 1/1998 |

* cited by examiner

US 10,293,466 B2

STRUCTURED ABRASIVE ARTICLES AND METHODS OF USING THE SAME

TECHNICAL FIELD

The present disclosure broadly relates to coated abrasive articles and methods of using them.

BACKGROUND

Structured abrasive articles are a specific type of coated abrasive article that has a plurality of shaped abrasive composites secured to a major surface of a backing. Each shaped abrasive composite has a bottom surface in contact with the backing and a distal end that extends outwardly from the backing. The shaped abrasive composites comprise abrasive particles dispersed in a binder matrix, typically including a crosslinked organic polymer. The shaped abrasive composites are usually arranged in an array. In one common configuration of a structured abrasive article, the shaped abrasive composites are pyramidal (e.g., tetrahedral or square pyramidal).

Traditionally, structured abrasive products such as, for example, those available as TRIZACT STRUCTURED ABRASIVE from 3M Company of St. Paul, Minn., have utilized pyramidal abrasive composites. Pyramids are typically used for a variety of reasons, not all of them based on abrading performance. For example, pyramids are an easy shape to produce in the tooling used in the manufacture of the structured abrasive products. Further, during manufacture, the tooling is typically relatively easy to fill with curable slurry and separate from the structured abrasive article after curing when pyramids are used.

A characteristic of pyramidal abrasive composites is a change in load-bearing area from the tops of the shaped composites to their bottom surfaces as they erode during use. Initially, the erosion is rather rapid. With continued use the load-bearing area increases until it reaches a point beyond which it no longer breaks down and stops efficiently abrading. This usually occurs when the load-bearing area is in a range of from fifty to seventy percent of the area of the working abrasive surface. In practice, this has limited the useful life of structured abrasive articles incorporating pyramidal shaped features.

Use of alternate designs for the shaped abrasive composites to overcome this problem is described in U.S. Pat. No. 8,425,278 B2 (Culler et al.). In that approach, cusps were formed at intersections of sidewalls and a grinding surface that included a recessed feature. However, in practice, problems with filling the mold cavities in the production tool may lead to malformed cusps, thereby reducing the reliability of the abrading performance of the resulting structured abrasive article or manufacturing yield.

Accordingly, there remains a need for structured abrasive articles that provide superior abrading properties to structured abrasive articles with pyramidal abrasive composites, while overcoming fill problems associated with the shaped abrasive composites described in U.S. Pat. No. 8,425,278 B2 (Culler et al.).

SUMMARY

In one aspect, the present disclosure provides a structured abrasive article comprising:
a backing having first and second opposed major surfaces;
shaped abrasive composites secured to the first major surface, wherein the precisely shaped abrasive composites comprise abrasive grits dispersed in a binder matrix, and wherein at least some of the shaped abrasive composites independently comprise:
a bottom surface;
a top surface opposite and not contacting the bottom surface, wherein the top surface comprises at least one interior recessed portion;
n sidewalls, wherein n represents an integer greater than or equal to three, wherein each one of the n sidewalls abuts both of the bottom surface and the top surface, and wherein each one of the n sidewalls abuts two other of the n sidewalls; and
at least two cusps formed by the top surface and respective different ones of the n sidewalls, wherein the at least one interior recessed portion is closer to the bottom surface than said at least two cusps.

In another aspect, the present disclosure provides a structured abrasive article comprising:
a backing having first and second opposed major surfaces;
shaped abrasive composites secured to the first major surface, wherein the precisely shaped abrasive composites comprise abrasive grits dispersed in a binder matrix, and wherein at least some of the shaped abrasive composites independently comprise:
a bottom surface;
a top surface opposite and not contacting the bottom surface, wherein the top surface comprises at least one interior recessed portion and at least two triangular facets;
n sidewalls, wherein n represents an integer greater than or equal to three, wherein each one of the n sidewalls abuts both of the bottom surface and the top surface, and wherein each one of the n sidewalls abuts two other of the n sidewalls, wherein each one of the at least two triangular facets, abuts a respective different one of the n sidewalls; and
at least two cusps formed in part by at least two of said at least two triangular facets, wherein the at least one interior recessed portion is closer to the bottom surface than said at least two cusps.

Advantageously, structured abrasive particles according to the present disclosure may exhibit more complete filling of mold cavities during manufacture than structured abrasive particles having cusps located at corners of the shaped abrasive composites. This results in improved manufacturing yield and/or structured abrasive article reliability.

Structured abrasive articles according to the present disclosure are useful for abrading a workpiece. Accordingly, in another aspect, the present disclosure provides a method of abrading a workpiece, the method comprising: frictionally contacting at least a portion of the abrasive layer of a structured abrasive article according to the present disclosure with a surface of the workpiece; and moving at least one of the workpiece or the abrasive layer relative to the other to abrade at least a portion of the surface of the workpiece.

As used herein, the term "cusp" refers to a point or ridge (preferably a point) having an altitude relative to the base that represents a local maximum of the top surface.

As used herein, the term "top surface" refers to the surface opposite the bottom surface of individual shaped abrasive composite(s), and not to the exposed surface of the abrasive layer as a whole, for which is termed the "working surface" will be used.

As used herein, the term "precisely-shaped abrasive composite" refers to a shaped abrasive composite formed by a process in which it is formed by at least partially curing a slurry residing in a cavity in a mold before being removed from the mold such that the resulting abrasive composite substantially replicates the surface finish and/or shape of the cavity.

Features and advantages of the present disclosure will be further understood upon consideration of the detailed description as well as the appended claims.

Figure 1:
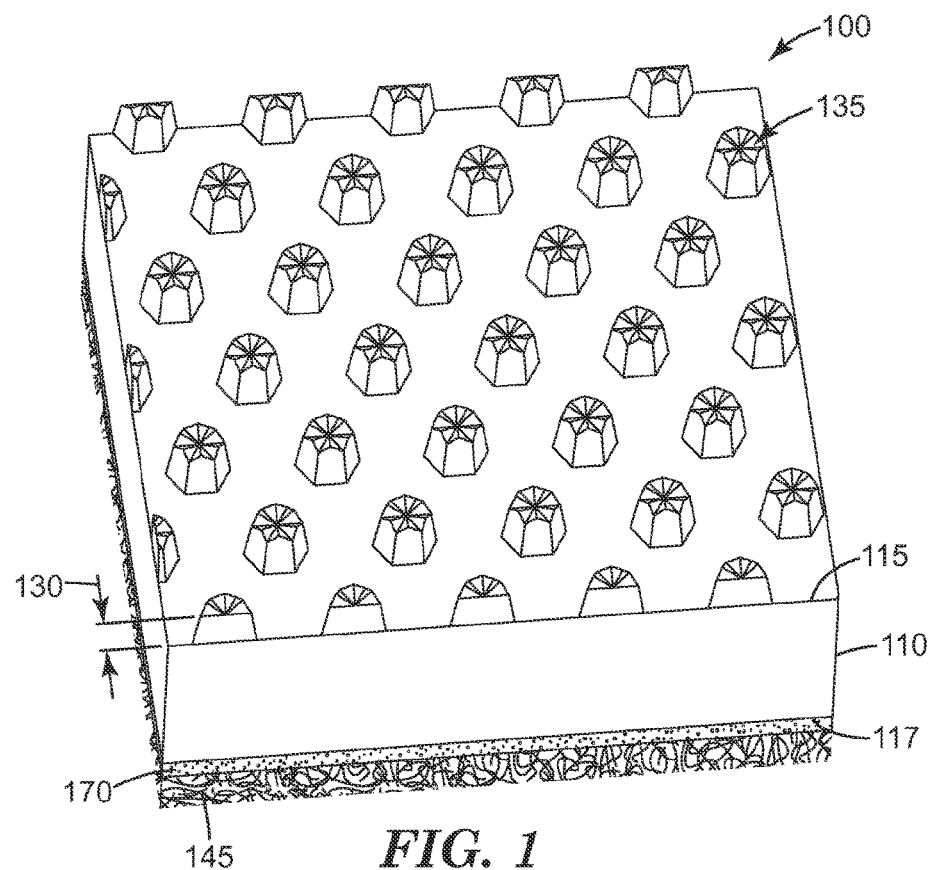
FIG. 1 is a schematic perspective view of an exemplary structured abrasive article 100 according to the present disclosure.

In the figures depicting shaped abrasive composites, all surfaces (including bottom surfaces, sidewalls, and facets) other than the top surfaces are planar, unless clearly indicated otherwise. Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

Referring now to FIG. 1, exemplary structured abrasive article 100 comprises backing 110, which has respective first and second major surfaces 115, 117. Abrasive layer 130 contacts and is secured to first major surface 115. Abrasive layer 130 comprises a plurality of precisely-shaped abrasive composites 135. Optional attachment interface layer 145 is secured to second major surface 117 by optional adhesive layer 170.

Figure 1A:
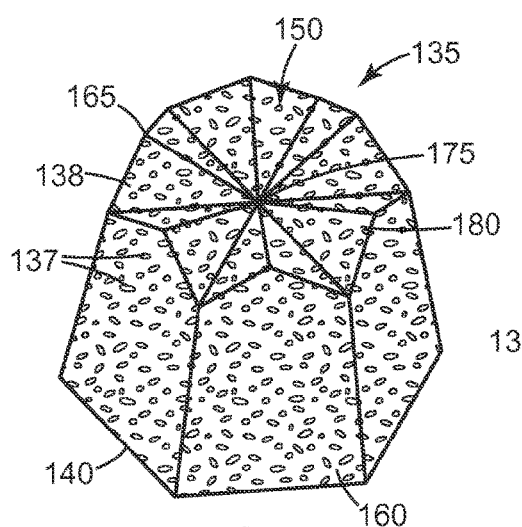
FIG. 1A is a schematic perspective view of precisely-shaped abrasive composite 135.
Figure 1B:
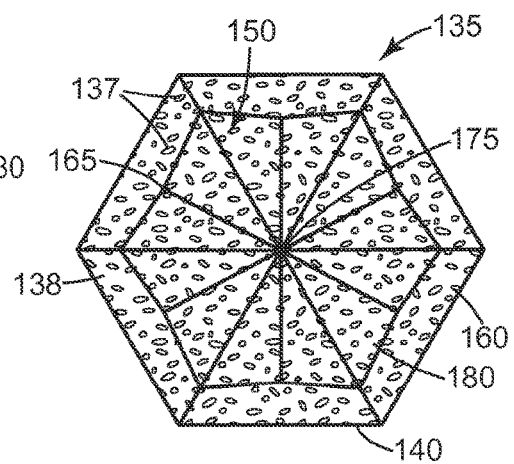
FIG. 1B is a schematic top view of precisely-shaped abrasive composite 135.

Referring now to FIGS. 1A and 1B, individual precisely-shaped abrasive composite 135 comprises abrasive particles 137 dispersed in binder matrix 138. Precisely-shaped abrasive composite 135 comprises planar bottom surface 140 disposed on and firmly secured to first major surface 115 of backing 110. Top surface 150 is opposite and does not contact bottom surface 140. Top surface 150 comprises interior recessed portion 175. Together, the six sidewalls 160, bottom surface 140 and top surface 150 define the entire surface of precisely-shaped abrasive composite 135. Each one of the six sidewalls 160 abuts bottom surface 140, top surface 150, and two other of the sidewalls 160. Six cusps 165 are formed by the top surface and each one of the respective sidewalls 160. Interior recessed portion 175 is closer to bottom surface 140 than cusps 165. Top surface 150 is composed of twelve facets 180.

Other shapes for the shaped abrasive composites may also be used instead of, or in addition to, precisely-shaped abrasive composites 135.

Figure 2A:
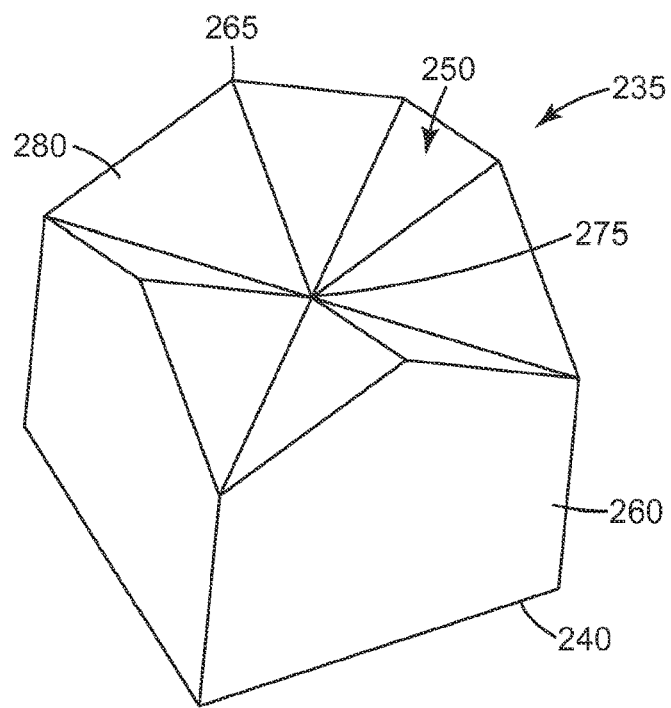
FIG. 2A is a schematic perspective view of shaped abrasive composite 235.
Figure 2B:
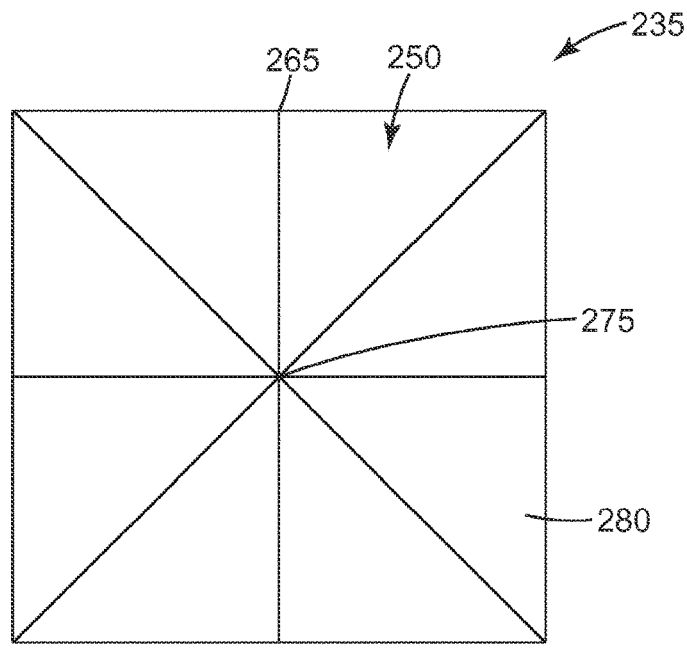
FIG. 2B is a schematic top view of shaped abrasive composite 235.

Another embodiment of a suitable shaped abrasive composite is shown in FIGS. 2A and 2B. Referring now to FIGS. 2A and 2B, precisely-shaped abrasive composite 235 comprises top surface 250 opposite and not contacting bottom surface 240. Top surface 250 comprises interior recessed portion 275. Together, the four sidewalls 260, bottom surface 240, and top surface 250 define the entire surface of shaped abrasive composite 235. Each one of sidewalls 260 abuts bottom surface 240, top surface 250, and two other of sidewalls 260. Four cusps 265 are formed by top surface 250 and each one of respective sidewalls 260. Interior recessed portion 275 is closer to bottom surface 240 than cusps 265. Top surface 250 is composed of eight facets 280.

Figure 3A:
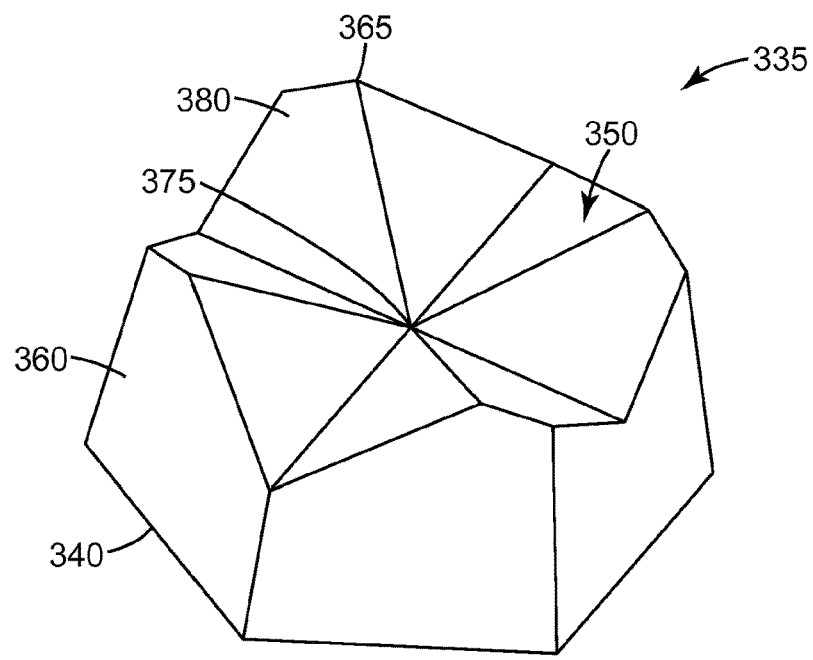
FIG. 3A is a schematic perspective view of shaped abrasive composite 335.
Figure 3B:
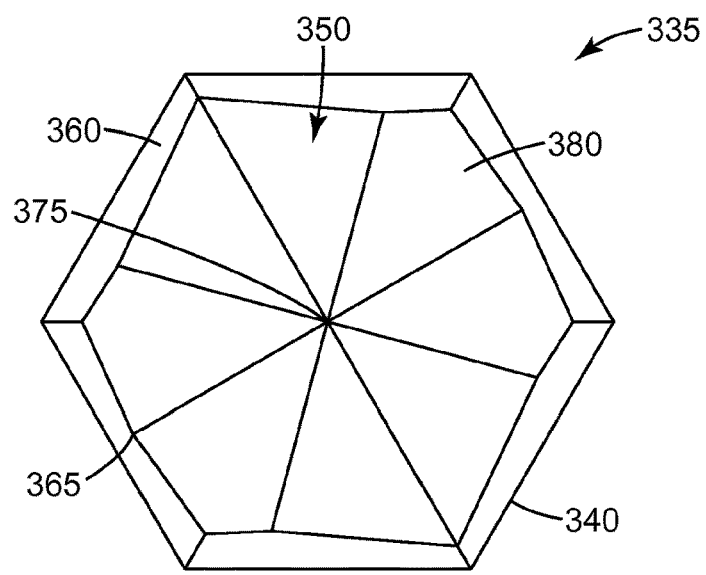
FIG. 3B is a schematic top view of shaped abrasive composite 335.

Yet another embodiment of a suitable shaped abrasive composite is shown in FIGS. 3A and 3B. Referring now to FIGS. 3A and 3B, precisely-shaped abrasive composite 335 comprises top surface 350 opposite and not contacting bottom surface 340. Top surface 350 comprises interior recessed portion 375. Together, the six sidewalls 360, bottom surface 340, and top surface 350 define the entire surface of shaped abrasive composite 335. Each one of sidewalls 360 abuts bottom surface 340, top surface 350, and two other of sidewalls 360. Four cusps 365 are formed by top surface 350 and each one of respective sidewalls 360. Interior recessed portion 375 is closer to bottom surface 340 than cusps 365. Top surface 350 is composed of eight facets 380.

Figure 4A:
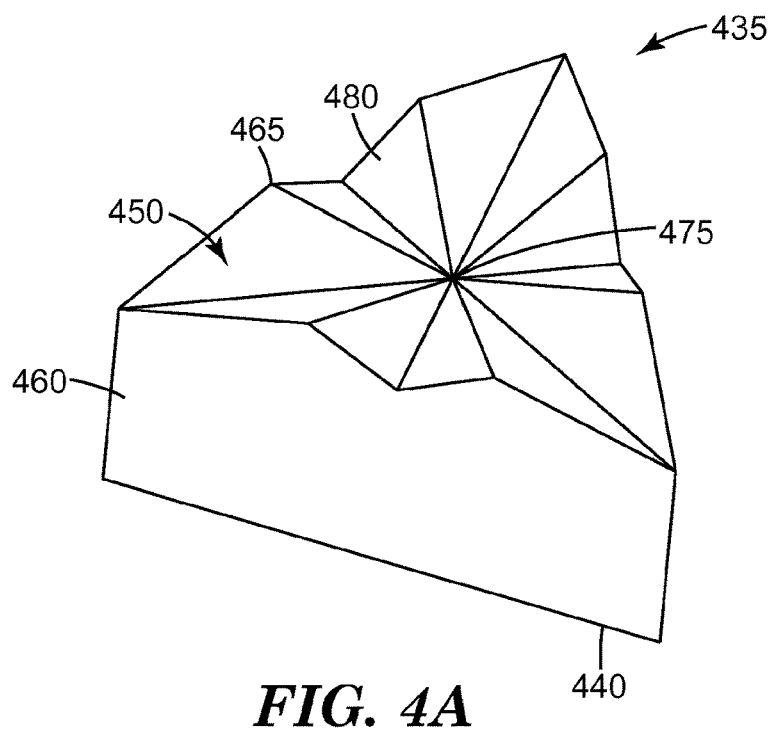
FIG. 4A is a schematic perspective view of shaped abrasive composite 435.
Figure 4B:
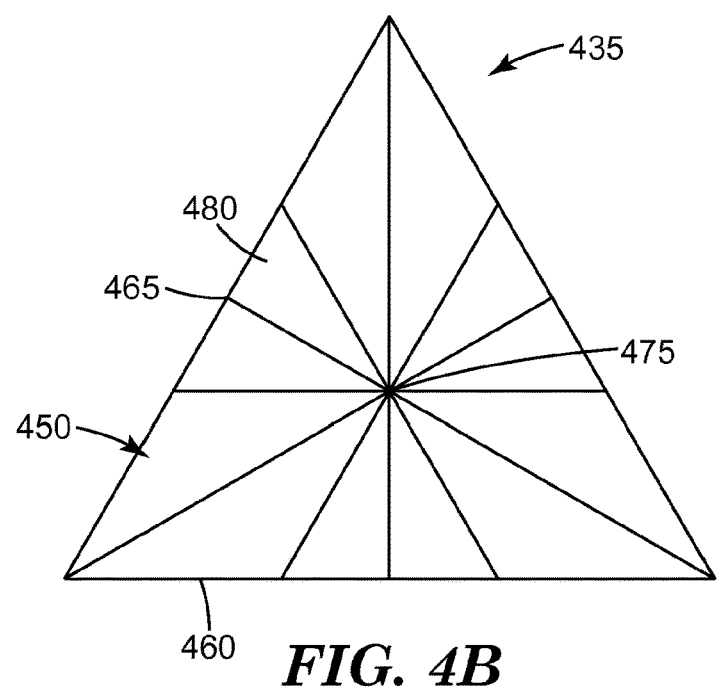
FIG. 4B is a schematic top view of shaped abrasive composite 435.

Yet another embodiment of a suitable shaped abrasive composite is shown in FIGS. 4A and 4B. Referring now to FIGS. 4A and 4B, precisely-shaped abrasive composite 435 comprises top surface 450 opposite and not contacting bottom surface 440. Top surface 450 comprises interior recessed portion 475. Together, the five sidewalls 460, bottom surface 440, and top surface 450 define the entire surface of shaped abrasive composite 435. Each one of sidewalls 460 abuts bottom surface 440, top surface 450, and two other of sidewalls 460. Each one of six cusps 465 is formed by top surface 450 and a sidewall 460 (two cusps per sidewall). Interior recessed portion 475 is closer to bottom surface 440 than cusps 465. Top surface 450 is composed of twelve facets 480.

Figure 5A:
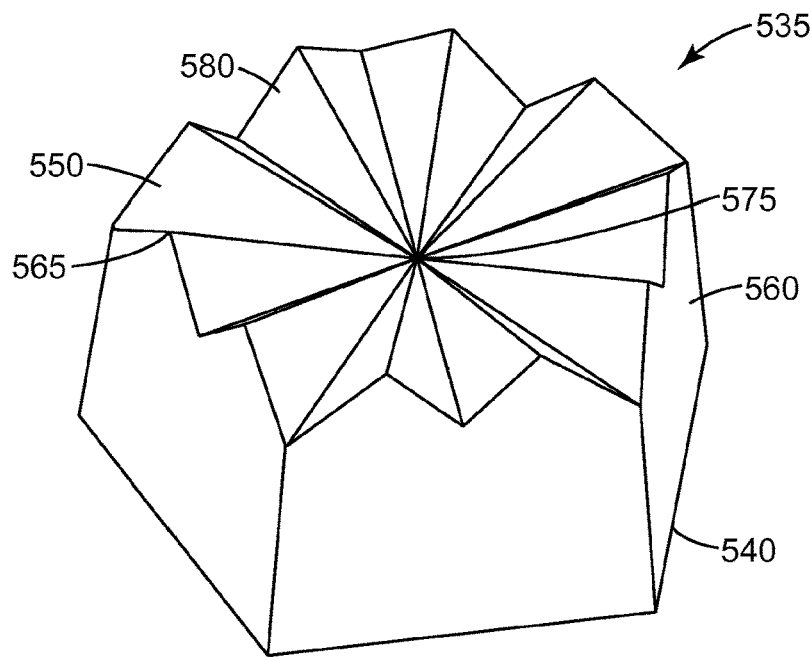
FIG. 5A is a schematic perspective view of shaped abrasive composite 535.
Figure 5B:
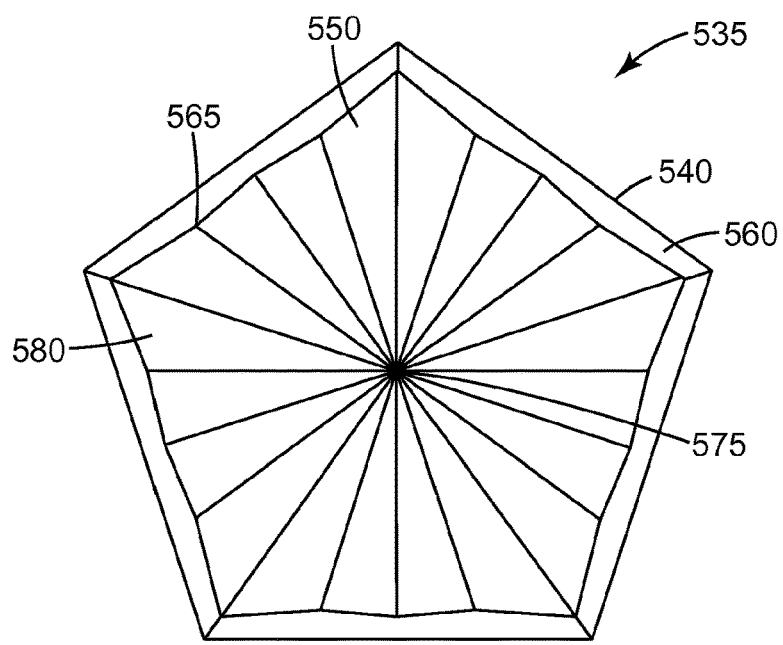
FIG. 5B is a schematic top view of shaped abrasive composite 535.

Yet another embodiment of a suitable shaped abrasive composite is shown in FIGS. 5A and 5B. Referring now to FIGS. 5A and 5B, precisely-shaped abrasive composite 535 comprises top surface 550 opposite and not contacting bottom surface 540. Top surface 550 comprises interior recessed portion 575. Together, the five sidewalls 560, bottom surface 540, and top surface 550 define the entire surface of shaped abrasive composite 535. Each one of sidewalls 560 abuts bottom surface 540, top surface 550, and two other of sidewalls 560. Each one of ten cusps 565 is formed by top surface 550 and a sidewall 560 (two cusps per sidewall). Interior recessed portion 575 is closer to bottom surface 540 than cusps 565. Top surface 550 is composed of twenty facets 580.

Figure 6:
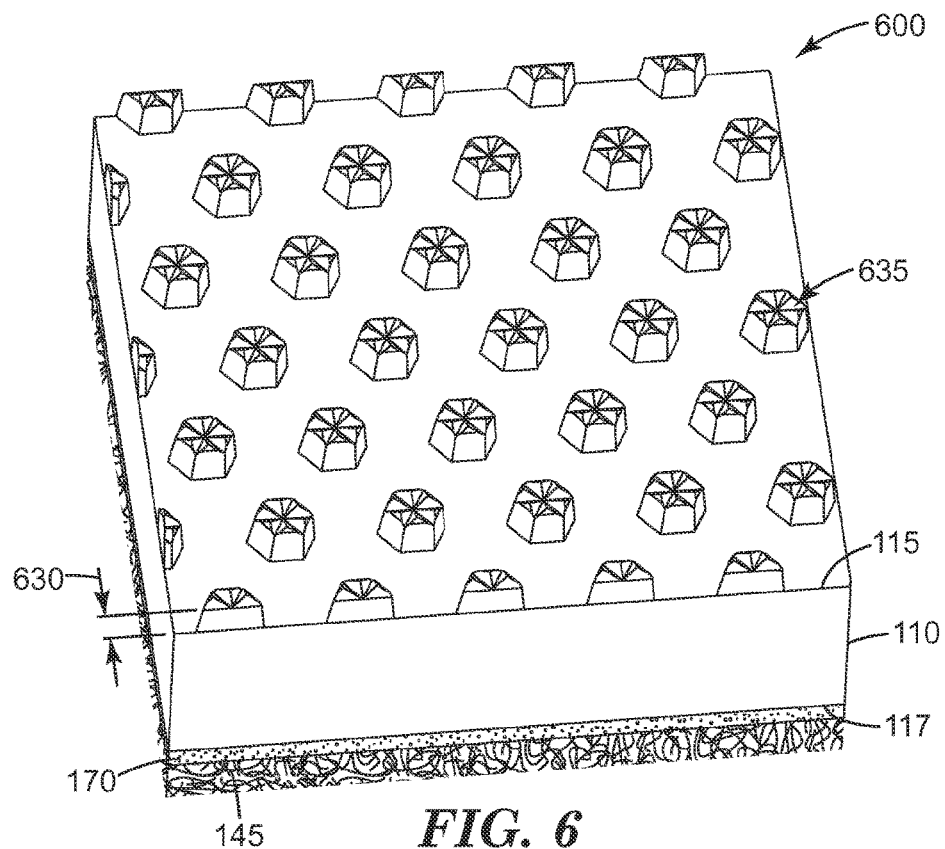
FIG. 6 is a schematic perspective view of exemplary structured abrasive article 600 according to the present disclosure.
Figure 6A:
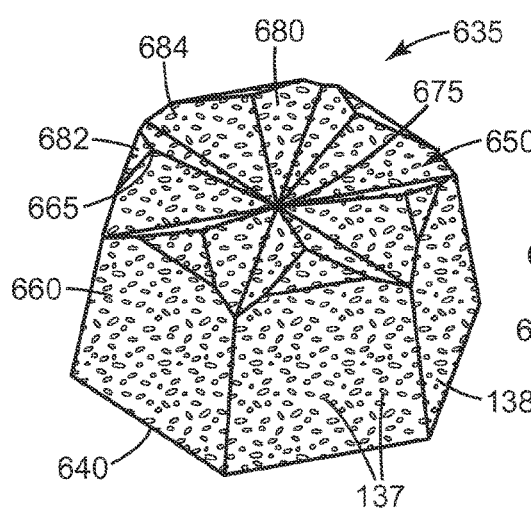
FIG. 6A is a schematic perspective view of shaped abrasive composite 635.

Referring now to FIG. 6, another exemplary structured abrasive article 600 comprises backing 110, which has respective first and second major surfaces 115, 117. Abrasive layer 630 contacts and is secured to first major surface 115. Abrasive layer 630 comprises a plurality of precisely-shaped abrasive composites 635. Optional attachment interface layer 145 is secured to second major surface 117 by optional adhesive layer 170. Referring now to FIG. 6A, precisely-shaped shaped abrasive composites 635 comprise bottom surface 640 disposed on and firmly secured to first major surface 115 of backing 110.

Figure 6B:
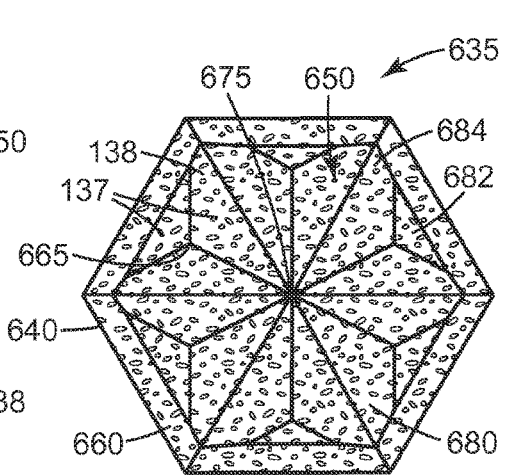
FIG. 6B is a schematic top view of shaped abrasive composite 635.

Referring now to FIGS. 6A and 6B, precisely-shaped abrasive composite 635 comprises abrasive particles 137 dispersed in binder matrix 138. Shaped abrasive composite 635 comprises bottom surface 640, top surface 650 opposite and not contacting bottom surface 640. Top surface 650 comprises interior recessed portion 675. Together with six sidewalls 660, bottom surface 640 and top surface 650 define the entire surface of precisely-shaped abrasive composite 635. Each one of the six sidewalls 660 abuts bottom surface 640, top surface 650, and two other of the sidewalls 660. Top surface 650 comprises six triangular facets 682 and twelve non-triangular facets 684. Each triangular facet 682 abuts a different one of sidewalls 660. Cusps 665 are partially formed by respective triangular facets 682, and form part of top surface 650. Interior recessed portion 675 is closer to bottom surface 640 than cusps 665. Top surface 650 is composed of eighteen facets 680.

Figure 7A:
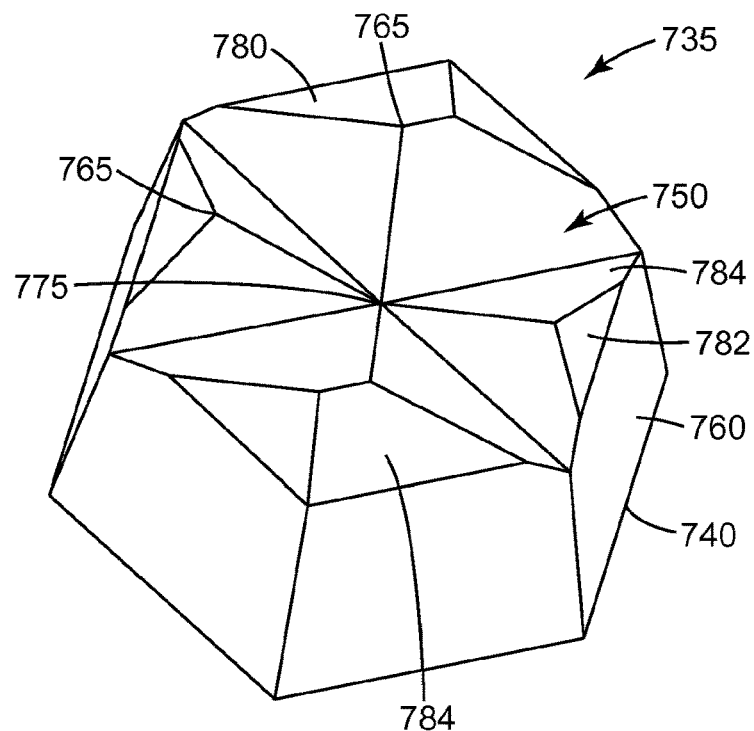
FIG. 7A is a schematic perspective view of shaped abrasive composite 735.
Figure 7B:
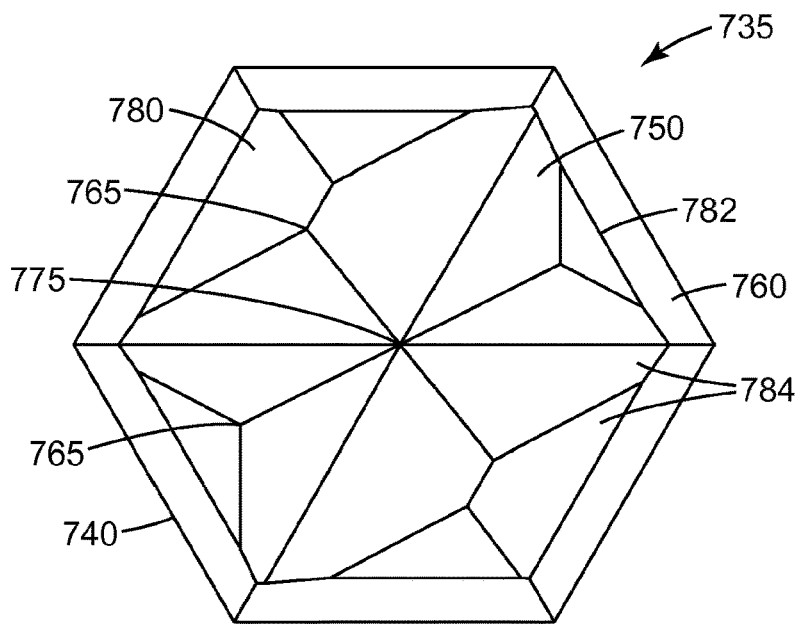
FIG. 7B is a schematic top view of shaped abrasive composite 735.

Another embodiment of this general type of shaped abrasive composite is shown in FIGS. 7A and 7B. Referring now to FIGS. 7A and 7B, shaped abrasive composite 735 comprises bottom surface 740, and top surface 750 opposite and not contacting bottom surface 740. Top surface 750 comprises interior recessed portion 775. Together with six sidewalls 760, bottom surface 740 and top surface 750 define the entire surface of shaped abrasive composite 735. Each one of the six sidewalls 760 abuts bottom surface 740, top surface 750, and two other of the sidewalls 760. Top surface 750 comprises six triangular facets 782 and ten non-triangular facets. Each triangular facet 782 abuts a different one of sidewalls 760. Four cusps 765 are partially formed by respective triangular facets 782, and form part of top surface 750. Interior recessed portion is closer to bottom surface 740 than cusps 765. Top surface 750 is composed of fourteen facets 780.

The shaped abrasive composites will now be discussed in greater detail.

The bottom surface, which is preferably planar, may have any shape such as, for example, a polygon. For example, it may be triangular, square, rectangular, or hexagonal, and may be regular or irregular in shape. Sidewalls extend upwardly from the bottom surface. The sidewalls may comprise planar and/or curved portions, but are preferably planar. Adjacent sidewalls share a common edge. Individual sidewalls may be vertical (i.e., forming a dihedral angle of 90 degrees with the bottom surface), or they may be sloped inward such that the sidewalls independently form dihedral angles with the bottom surface of less than 90 degrees.

Each of the shaped abrasive composites has a top surface that is not in contact with the bottom surface. The top surface is bounded by the sidewalls and does not contact the bottom surface. The top surface includes at least two cusps and at least one internal recessed portion. In some embodiments, the number of cusps and the number of sidewalls is the same, although the number of cusps contacting the top surface may be greater or less than the number of sidewalls. In some embodiments, the number of sidewalls is 4, 5, 6, 7, 8, or more. Preferably, the number of sidewalls is an even number (e.g., 4 or 6). In various embodiments, the number of cusps is 2, 3, 4, 5, 6, 7, 8, or more. In some embodiments, two or more cusps (e.g., 2, 3, or 4 cusps) may be partially formed by a single one of the sidewalls.

In some embodiments, at least two, at least three, at least four, at least 5, at least 6, or even at least n cusps may be partially formed by respective different ones of the n sidewalls and the top surface. For example, at least some (e.g., all or less than all of the cusps) may be formed by the top surface and different respective sidewalls (i.e., a first cusp from the first sidewall and the top surface, a cusp from the second side wall and the top surface, etc.).

Examples of useful backings include films, foams (open cell or closed cell), papers, foils, and fabrics. The backing may be, for example, a thermoplastic film that includes a thermoplastic polymer, which may contain various additive(s). Examples of suitable additives include colorants, processing aids, reinforcing fibers, heat stabilizers, UV stabilizers, and antioxidants. Examples of useful fillers include clays, calcium carbonate, glass beads, talc, clays, mica, wood flour; and carbon black. The backing may be a composite film, for example a coextruded film having two or more discrete layers.

Suitable thermoplastic polymers include, for example, polyolefins (e.g., polyethylene, and polypropylene), polyesters (e.g., polyethylene terephthalate), polyamides (e.g., nylon-6 and nylon-6,6), polyimides, polycarbonates, and combinations and blends thereof.

Typically, the average thickness of the backing is in a range of from at least 1 mil (25 microns) to 100 mils (2.5 mm), although thicknesses outside of this range may also be used.

The abrasive layer comprises shaped abrasive composites, each comprising abrasive particles dispersed in a polymeric binder. The structured abrasive layer may be continuous or discontinuous, for example, it may have regions devoid of shaped abrasive composites. Typically, the shaped abrasive composites are arranged on the backing according to a predetermined pattern or array, although this is not a requirement. The shaped abrasive composites may have substantially identical shapes and/or sizes or a mixture of various shapes and/or sizes. Typically, essentially all of the shaped abrasive composites in the abrasive layer have the same size and shape, allowing for manufacturing tolerances (e.g., with respect to missing portions of some shaped abrasive composites or excess material that may be present), although different shapes and sizes are also permissible.

In preferred embodiments, the shaped abrasive composites are "precisely-shaped" abrasive composites, although this is not a requirement. This means that the precisely-shaped abrasive composites are defined by relatively smooth surfaced sides that are bounded and joined by well-defined edges having distinct edge lengths with distinct endpoints defined by the intersections of the various sides. The terms "bounded" and "boundary" refer to the exposed surfaces and edges of each composite that delimit and define the actual three-dimensional shape of each precisely-shaped abrasive composite. These boundaries are readily visible and discernible when a cross-section of an abrasive article is viewed under a scanning electron microscope. These boundaries separate and distinguish one precisely-shaped abrasive composite from another even if the composites abut each other along a common border at their bottom surfaces. By comparison, in a precisely-shaped abrasive composite that does not have a precise shape, the boundaries and edges are not well-defined (e.g., where the abrasive composite sags before completion of its curing).

The abrasive layer comprises shaped abrasive composites, preferably including at least some precisely-shaped abrasive composites, although this is not a requirement. At least some of the abrasive composites comprise a bottom surface, walls, and a top surface comprising cusps, and facets. In some embodiments, the number of facets is twice the number of cusps. In some embodiments, the shaped abrasive composites have substantially the same size and shape, although they may be different. The walls of individual shaped abrasive composites may have the same size and/or shape, although they may be different. The facets of individual shaped abrasive composites may have the same size and/or shape, although they may be different. The cusps of individual shaped abrasive composites may have the same size and/or shape, although they may be different. The cusps of individual shaped abrasive composites may be equidistant from the bottom surface, or they may have different heights. In some embodiments, they may have different sizes and/or shapes.

The walls may be sloped such that the dihedral angle formed by any given wall and the bottom surface is in a range of from about 20 to 90 degrees, typically in a range of from about 80 to 87 degrees, more typically in a range of from about 83 to 85 degrees, although other angles may also be used.

Likewise, facets contacting adjacent cusps may independently define dihedral angles in a range of from 120 to 135 degrees, more typically 125 to 130 degrees, although other angles may be used.

In some embodiments, the shaped abrasive composites in the abrasive layer consist essentially (i.e., other than shapes due to manufacturing defects) of the shaped abrasive composites described above. As used herein, the term "manufacturing defect" refers to an unintentional depression, air-void, or bubble in the shape of surface of the shaped abrasive composite that typically varies in location and/or size from one shaped abrasive composite to the next. By looking at the overall shape and pattern of many shaped abrasive composites in the abrasive article, the shaped abrasive composite defects are readily discernible when comparing the individual shaped abrasive composites in the abrasive layer.

Advantageously, shaped abrasive composites constructed as above may be formed such that they exhibit minimal change in load-bearing area after a period of initial use, while simultaneously providing sufficient abrasive points and edges (cusps and facet joint ridges) that a sufficient degree of initial cut is also achieved. While not wishing to be bound by theory, the present inventors believe that erosion of the relatively weak cusps is desirable in that it exposes mineral at the top surface that would otherwise be covered by a layer of polymeric binder, thereby contributing to initial cut performance. Accordingly, were the shaped abrasive composites to have flat tops, poor initial cut would be expected.

The foregoing shaped abrasive composites may be combined with abrasive composites having different shapes. Examples include pyramids (e.g., three-sided pyramids or four-sided pyramids), prisms, and rods.

The shaped abrasive composites may comprise a close packed array; however, it is presently found that by separating the shaped abrasive composites it is possible to control the load-bearing area of the structured abrasive article. As used herein, the term "load-bearing area", expressed as a percentage, refers to the combined area of all bottom surfaces of all shaped abrasive composites divided by the total area of the first surface of the backing. Typically, the load-bearing area is in a range of from 10 to 100 percent, more typically in a range of from 15 to 60 percent, and still more typically in a range of from 20 to 50 percent, although this is not a requirement. Load-bearing areas less than 100 percent may be achieved, for example, by including channels between individual shaped abrasive composites, or between close packed arrays of the shaped abrasive composites.

For fine finishing applications, the height of the shaped abrasive composites is generally greater than or equal to one micron and less than or equal to 20 mils (510 microns); for example, less than 15 mils (380 microns), 10 mils (250 microns), 5 mils (130 microns), 2 mils (50 microns), or even less than one mil (25 microns), although greater and lesser heights may also be used.

For fine finishing applications, the areal density of the shaped abrasive composites in the abrasive layer is typically in a range of from at least 1000, 10000, or even at least 20000 shaped abrasive composites per square inch (e.g., at least 150, 1500, or even 7800 shaped abrasive composites per square centimeter) up to and including 50000, 70000, or even as many as 100000 shaped abrasive composites per square inch (7800, 11000, or even as many as 15000 shaped abrasive composites per square centimeter), although greater or lesser densities of shaped abrasive composites may also be used.

Any abrasive particle may be included in the abrasive composites. Typically, the abrasive particles have a Mohs' hardness of at least 8, or even 9. Examples of such abrasive particles include aluminum oxide, fused aluminum oxide, ceramic aluminum oxide, white fused aluminum oxide, heat treated aluminum oxide, silica, silicon carbide, green silicon carbide, alumina zirconia, diamond, iron oxide, cubic boron nitride, garnet, tripoli, sol-gel derived abrasive particles, and combinations thereof.

Typically, the abrasive particles have an average particle size of less than or equal to 1500 microns, although average particle sizes outside of this range may also be used. For repair and finishing applications, useful abrasive particle sizes typically range from an average particle size in a range of from at least 0.01, 1, 3 or even 5 microns up to and including 35, 100, 250, 500, or even as much as 1500 microns.

The abrasive particles are dispersed in a polymeric binder, which may be thermoplastic and/or crosslinked. This is generally accomplished by dispersing the abrasive particles in a binder precursor usually in the presence of an appropriate curative (e.g., photoinitiator, thermal curative, and/or catalyst). Examples of suitable polymeric binders that are useful in abrasive composites include phenolics, aminoplasts, urethanes, epoxies, acrylics, cyanates, isocyanurates, glue, and combinations thereof.

Typically, the polymeric binder is prepared by crosslinking (e.g., at least partially curing and/or polymerizing) a binder precursor. During the manufacture of the structured abrasive article, the polymeric binder precursor is exposed to an energy source which aids in the initiation of polymerization (typically including crosslinking) of the binder precursor. Examples of energy sources include thermal energy and radiation energy which includes electron beam, ultraviolet light, and visible light. In the case of an electron beam energy source, curative is not necessarily required because the electron beam itself generates free radicals.

After this polymerization process, the binder precursor is converted into a solidified binder. Alternatively for a thermoplastic binder precursor, during the manufacture of the abrasive article the thermoplastic binder precursor is cooled to a degree that results in solidification of the binder precursor. Upon solidification of the binder precursor, the abrasive composite is formed.

There are two main classes of polymerizable resins that may be included in the binder precursor, condensation polymerizable resins and addition polymerizable resins. Addition polymerizable resins are advantageous because they are readily cured by exposure to radiation energy. Addition polymerized resins can polymerize, for example, through a cationic mechanism or a free-radical mechanism. Depending upon the energy source that is utilized and the binder precursor chemistry, a curing agent, initiator, or catalyst may be useful to help initiate the polymerization.

Examples of typical binder precursors include phenolic resins, urea-formaldehyde resins, aminoplast resins, urethane resins, melamine formaldehyde resins, cyanate resins, isocyanurate resins, (meth)acrylate resins (e.g., (meth)acrylated urethanes, (meth)acrylated epoxies, ethylenically-unsaturated free-radically polymerizable compounds, aminoplast derivatives having pendant alpha, beta-unsaturated carbonyl groups, isocyanurate derivatives having at least one pendant acrylate group, and isocyanate derivatives having at least one pendant acrylate group) vinyl ethers, epoxy resins, and mixtures and combinations thereof. As used herein, the term "(meth)acryl" encompasses acryl and methacryl.

Phenolic resins have good thermal properties, availability, and relatively low cost and ease of handling. There are two types of phenolic resins, resole and novolac. Resole phenolic resins have a molar ratio of formaldehyde to phenol of greater than or equal to one to one, typically in a range of from 1.5:1.0 to 3.0:1.0. Novolac resins have a molar ratio of formaldehyde to phenol of less than one to one. Examples of commercially available phenolic resins include those known by the trade designations DUREZ and VARCUM from Occidental Chemicals Corp., Dallas, Tex.; RESINOX from Monsanto Co., Saint Louis, Mo.; and AEROFENE and AROTAP from Ashland Specialty Chemical Co., Dublin, Ohio.

(Meth)acrylated urethanes include di(meth)acrylate esters of hydroxyl-terminated NCO extended polyesters or polyethers. Examples of commercially available acrylated urethanes include those available as CMD 6600, CMD 8400, and CMD 8805 from Cytec Industries, West Paterson, N.J.

(Meth)acrylated epoxies include di(meth)acrylate esters of epoxy resins such as the diacrylate esters of bisphenol A epoxy resin. Examples of commercially available acrylated epoxies include those available as CMD 3500, CMD 3600, and CMD 3700 from Cytec Industries.

Ethylenically-unsaturated free-radically polymerizable compounds include both monomeric and polymeric compounds that contain atoms of carbon, hydrogen, and oxygen, and optionally, nitrogen and the halogens. Oxygen or nitrogen atoms or both are generally present in ether, ester, urethane, amide, and urea groups. Ethylenically-unsaturated free-radically polymerizable compounds typically have a molecular weight of less than about 4,000 g/mole and are typically esters made from the reaction of compounds containing a single aliphatic hydroxyl group or multiple aliphatic hydroxyl groups and unsaturated carboxylic acids, such as acrylic acid, methacrylic acid, itaconic acid, crotonic acid, isocrotonic acid, maleic acid, and the like. Representative examples of (meth)acrylate resins include methyl methacrylate, ethyl methacrylate styrene, divinylbenzene, vinyl toluene, ethylene glycol diacrylate, ethylene glycol methacrylate, hexanediol diacrylate, triethylene glycol diacrylate, trimethylolpropane triacrylate, glycerol triacrylate, pentaerythritol triacrylate, pentaerythritol methacrylate, pentaerythritol tetraacrylate and pentaerythritol tetraacrylate. Other ethylenically unsaturated resins include monoallyl, polyallyl, and polymethallyl esters and amides of carboxylic acids, such as diallyl phthalate, diallyl adipate, and N,N-diallyladipamide. Still other nitrogen containing compounds include tris(2-acryloyl-oxyethyl)isocyanurate, 1,3,5-tris(2-methyacryloxyethyl)-s-triazine, acrylamide, N-methylacrylamide, N,N-dimethylacrylamide, N-vinylpyrrolidone, and N-vinylpiperidone.

Useful aminoplast resins have at least one pendant alpha, beta-unsaturated carbonyl group per molecule or oligomer. These unsaturated carbonyl groups can be acrylate, methacrylate, or acrylamide type groups. Examples of such materials include N-(hydroxymethyl)acrylamide, N,N'-oxydimethylenebisacrylamide, ortho- and para-acrylamidomethylated phenol, acrylamidomethylated phenolic novolac, and combinations thereof. These materials are further described in U.S. Pat. Nos. 4,903,440 and 5,236,472 (both to Kirk et al.).

Isocyanurate derivatives having at least one pendant acrylate group and isocyanate derivatives having at least one pendant acrylate group are further described in U.S. Pat. No. 4,652,274 (Boettcher et al.). An example of one isocyanurate material is the triacrylate of tris(hydroxyethyl)isocyanurate.

Epoxy resins have one or more epoxy groups that may be polymerized by ring opening of the epoxy group(s). Such epoxy resins include monomeric epoxy resins and oligomeric epoxy resins. Examples of useful epoxy resins include 2,2-bis[4-(2,3-epoxypropoxy)-phenyl propane] (diglycidyl ether of bisphenol) and materials available as EPON 828, EPON 1004, and EPON 1001F from Momentive Specialty Chemicals, Columbus, Ohio; and DER-331, DER-332, and DER-334 from Dow Chemical Co., Midland, Mich. Other suitable epoxy resins include glycidyl ethers of phenol formaldehyde novolac commercially available as DEN-431 and DEN-428 from Dow Chemical Co.

The epoxy resins can polymerize via a cationic mechanism with the addition of an appropriate cationic curing agent. Cationic curing agents generate an acid source to initiate the polymerization of an epoxy resin. These cationic curing agents can include a salt having an onium cation and a halogen containing a complex anion of a metal or metalloid. Other curing agents (e.g., amine hardeners and guanidines) for epoxy resins and phenolic resins may also be used.

Other cationic curing agents include a salt having an organometallic complex cation and a halogen containing complex anion of a metal or metalloid which are further described in U.S. Pat. No. 4,751,138 (Tumey et al.). Another example is an organometallic salt and an onium salt is described in U.S. Pat. No. 4,985,340 (Palazzotto et al.); U.S. Pat. No. 5,086,086 (Brown-Wensley et al.); and U.S. Pat. No. 5,376,428 (Palazzotto et al.). Still other cationic curing agents include an ionic salt of an organometallic complex in which the metal is selected from the elements of Periodic Group IVB, VB, VIB, VIIB and VIIIB which is described in U.S. Pat. No. 5,385,954 (Palazzotto et al.).

Examples of free radical thermal initiators include peroxides, e.g., benzoyl peroxide and azo compounds.

Compounds that generate a free radical source if exposed to actinic electromagnetic radiation are generally termed photoinitiators. Examples of photoinitiators include benzoin and its derivatives such as alpha-methylbenzoin; alpha-phenylbenzoin; alpha-allylbenzoin; alpha-benzylbenzoin; benzoin ethers such as benzil dimethyl ketal (e.g., as commercially available as IRGACURE 651 from Ciba Specialty Chemicals, Tarrytown, N.Y.), benzoin methyl ether, benzoin ethyl ether, benzoin n-butyl ether; acetophenone and its derivatives such as 2-hydroxy-2-methyl-1-phenyl-1-propanone (e.g., as DAROCUR 1173 from Ciba Specialty Chemicals) and 1-hydroxycyclohexyl phenyl ketone (e.g., as IRGACURE 184 from Ciba Specialty Chemicals); 2-methyl-1-[4-(methylthio)phenyl]-2-(4-morpholinyl)-1-propanone (e.g., as IRGACURE 907 from Ciba Specialty Chemicals; 2-benzyl-2-(dimethylamino)-1-[4-(4-morpholinyl)phenyl]-1-butanone (e.g., as IRGACURE 369 from Ciba Specialty Chemicals). Other useful photoinitiators include, for example, pivaloin ethyl ether, anisoin ethyl ether, anthraquinones (e.g., anthraquinone, 2-ethylanthraquinone, 1-chloroanthraquinone, 1,4-dimethylanthraquinone, 1-methoxyanthraquinone, or benzanthraquinone), halomethyltriazines, benzophenone and its derivatives, iodonium salts and sulfonium salts, titanium complexes such as bis(eta$_5$-2,4-cyclopentadien-1-yl)-bis[2,6-difluoro-3(1H-pyrrol-1-yl)phenyl]titanium (e.g., as CGI 784DC from Ciba Specialty Chemicals); halonitrobenzenes (e.g., 4-bromomethylnitrobenzene), mono- and bis-acylphosphines (e.g., as IRGACURE 1700, IRGACURE 1800, IRGACURE 1850, and DAROCUR 4265 all from Ciba Specialty Chemicals). Combinations of photoinitiators may be used. One or more spectral sensitizers (e.g., dyes) may be used in conjunction with the photoinitiator(s), for example, in order to increase sensitivity of the photoinitiator to a specific source of actinic radiation.

To promote an association bridge between the abovementioned binder and the abrasive particles, a silane coupling agent may be included in the slurry of abrasive particles and binder precursor; typically in an amount of from about 0.01 to 5 percent by weight, more typically in an amount of from about 0.01 to 3 percent by weight, more typically in an amount of from about 0.01 to 1 percent by weight, although other amounts may also be used, for example depending on the size of the abrasive particles. Suitable silane coupling agents include, for example, methacryloxypropylsilane, vinyltriethoxysilane, vinyltris(2-methoxyethoxy)silane, 3,4-epoxycyclohexylmethyltrimethoxysilane, gamma-glycidoxypropyltrimethoxysilane, and gamma-mercaptopropyltrimethoxysilane (e.g., as available under the respective trade designations A-174, A-151, A-172, A-186, A-187, and A-189 from Witco Corp. of Greenwich, Conn.), allyltriethoxysilane, diallyldichlorosilane, divinyldiethoxysilane, and meta, para-styrylethyltrimethoxysilane (e.g., as commercially available under the respective trade designations A0564, D4050, D6205, and S 1588 from United Chemical Industries, Bristol, Pa.), dimethyldiethoxysilane, dihydroxydiphenylsilane, triethoxysilane, trimethoxysilane, triethoxysilanol, 3-(2-aminoethylamino)propyltrimethoxysilane, methyltrimethoxysilane, vinyltriacetoxysilane, methyltriethoxysilane, tetraethyl orthosilicate, tetramethyl orthosilicate, ethyltriethoxysilane, amyltriethoxysilane, ethyltrichlorosilane, amyltrichlorosilane, phenyltrichlorosilane, phenyltriethoxysilane, methyltrichlorosilane, methyldichlorosilane, dimethyldichlorosilane, dimethyldiethoxysilane, and mixtures thereof.

The binder precursor may optionally contain additives such as, for example, colorants, grinding aids, fillers, wetting agents, dispersing agents, light stabilizers, and antioxidants.

Grinding aids, which may optionally be included in the abrasive layer via the binder precursor, encompass a wide variety of different materials including both organic and inorganic compounds. A sampling of chemical compounds effective as grinding aids includes waxes, organic halide compounds, halide salts, metals and metal alloys. Specific waxes effective as a grinding aid include specifically, but not exclusively, the halogenated waxes tetrachloronaphthalene and pentachloronaphthalene. Other effective grinding aids include halogenated thermoplastics, sulfonated thermoplastics, waxes, halogenated waxes, sulfonated waxes, and mixtures thereof. Other organic materials effective as a grinding aid include specifically, but not exclusively, polyvinylchloride and polyvinylidene chloride. Examples of halide salts generally effective as a grinding aid include sodium chloride, potassium cryolite, sodium cryolite, ammonium cryolite, potassium tetrafluoroborate, sodium tetrafluoroborate, silicon fluorides, potassium chloride, and magnesium chloride. Halide salts employed as a grinding aid typically have an average particle size of less than 100 microns, with particles of less than 25 microns being preferred. Examples of metals generally effective as a grinding aid include antimony, bismuth, cadmium, cobalt, iron, lead, tin, and titanium. Other commonly used grinding aids include sulfur, organic sulfur compounds, graphite, and metallic sulfides. Combinations of these grinding aids can also be employed.

The optional supersize, if present, is disposed on at least a portion of the abrasive layer. For example, a supersize may be disposed only on the shaped abrasive composites (e.g., on their top surfaces), although it may also be disposed on the channels. Examples of supersizes include one or more compounds selected from the group consisting of secondary grinding aids such as alkali metal tetrafluoroborate salts, metal salts of fatty acids (e.g., zinc stearate or calcium stearate), and salts of phosphate esters (e.g., potassium behenyl phosphate), phosphate esters, urea-formaldehyde resins, mineral oils, crosslinked silanes, crosslinked silicones, and/or fluorochemicals; fibrous materials; antistatic agents; lubricants; surfactants; pigments; dyes; coupling agents; plasticizers: antiloading agents; release agents; suspending agents; rheology modifiers; curing agents; and mixtures thereof. A secondary grinding aid is preferably selected from the group of sodium chloride, potassium aluminum hexafluoride, sodium aluminum hexafluoride, ammonium aluminum hexafluoride, potassium tetrafluoroborate, sodium tetrafluoroborate, silicon fluorides, potassium chloride, magnesium chloride, and mixtures thereof. In some embodiments, one or more metal salts of fatty acids (e.g., zinc stearate) may be usefully included in the supersize.

The structured abrasive article may optionally include an attachment interface layer such as, for example, a hooked film, looped fabric, or pressure-sensitive adhesive that affixes the structured abrasive article to a tool or backup pad during use.

Useful pressure-sensitive adhesives (PSAs) include, for example, hot melt PSAs, solvent-based PSAs, and latex-based PSAs. Pressure-sensitive adhesives are widely commercially available; for example, from 3M Company. The PSA layer, if present may be coated onto the backing any suitable technique including, for example, spraying, knife coating, and extrusion coating. In some embodiments, a release liner may be disposed on the pressure-sensitive layer to protect it prior to use. Examples of release liners include polyolefin films and siliconized papers.

Structured abrasive articles according to the present disclosure may be prepared by forming a slurry of abrasive grains and a solidifiable or polymerizable precursor of the abovementioned binder resin (i.e., a binder precursor), contacting the slurry with a backing (or if present, optional adhesive layer) and at least partially curing the binder precursor (e.g., by exposure to an energy source) in a manner such that the resulting structured abrasive article has a plurality of shaped abrasive composites affixed to the backing. Examples of energy sources include thermal energy and radiant energy (including electron beam, ultraviolet light, and visible light).

In one embodiment, a slurry of abrasive particles in a binder precursor may be coated directly onto a production tool having shaped cavities (preferably cavities formed of planar surfaces that intersect at sharp angles) therein and brought into contact with the backing (or if present, optional adhesive layer), or coated on the backing and brought to contact with the production tool. In this embodiment, the slurry is typically then solidified (e.g., at least partially cured) while it is present in the cavities of the production tool.

The production tool can be a belt, a sheet, a continuous sheet or web, a coating roll such as a rotogravure roll, a sleeve mounted on a coating roll, or die. The production tool can be composed of metal (e.g., nickel), metal alloys, or plastic. The metal production tool can be fabricated by any conventional technique such as, for example, engraving, bobbing, electroforming, or diamond turning. A thermoplastic tool can be replicated off a metal master tool. The master tool will have the inverse pattern desired for the production tool. The master tool can be made in the same manner as the production tool. The master tool is preferably made out of metal, e.g., nickel and is diamond turned. The thermoplastic sheet material can be heated along with the master tool such that the thermoplastic material is embossed with the master tool pattern by pressing the two together. The thermoplastic can also be extruded or cast onto the master tool and then pressed. The thermoplastic material is cooled to solidify and produce the production tool. Examples of thermoplastic production tool materials include polyester, polycarbonates, polyvinyl chloride, polypropylene, polyethylene and combinations thereof. If a thermoplastic production tool is utilized, then care should typically be taken not to generate excessive heat that may distort the thermoplastic production tool.

The production tool may also contain a release coating to permit easier release of the abrasive article from the production tool. Examples of such release coatings for metals include hard carbide, nitrides or borides coatings. Examples of release coatings for thermoplastics include silicones and fluorochemicals.

Additional details concerning methods of manufacturing structured abrasive articles having precisely-shaped abrasive composites may be found, for example, in U.S. Pat. No. 5,152,917 (Pieper et al.); U.S. Pat. No. 5,435,816 (Spurgeon et al.); U.S. Pat. No. 5,672,097 (Hoopman); U.S. Pat. No. 5,681,217 (Hoopman et al.); U.S. Pat. No. 5,454,844 (Hibbard et al.); U.S. Pat. No. 5,851,247 (Stoetzel et al.); and U.S. Pat. No. 6,139,594 (Kincaid et al.).

In another embodiment, a slurry comprising a binder precursor and abrasive particles may be deposited on a backing in a patterned manner (e.g., by screen or gravure printing) and partially polymerized to render at least the surface of the coated slurry plastic but non-flowing. Then, a pattern is embossed upon the partially polymerized slurry formulation, which is subsequently further cured (e.g., by exposure to an energy source) to form a plurality of shaped abrasive composites affixed to the backing. Further details concerning this method and related methods are described, for example, in U.S. Pat. No. 5,833,724 (Wei et al.); U.S. Pat. No. 5,863,306 (Wei et al.); U.S. Pat. No. 5,908,476 (Nishio et al.); U.S. Pat. No. 6,048,375 (Yang et al.); U.S. Pat. No. 6,293,980 (Wei et al.); and U.S. Pat. Appl. Publ. No. 2001/0041511 (Lack et al.).

In this embodiment, once the abrasive layer is affixed to the backing, the resultant structured abrasive articles, whether in sheet or disc form at this point, have shaped features embossed therein such that both the backing and the structured abrasive layer have superposed embossed features. Embossing may be accomplished by any suitable means including, for example, application of heat and/or pressure to an embossing die (i.e., by embossing) having the desired pattern (or its inverse) depending on the embossing conditions used. The embossing die may comprise, for example, a plate or a roll. Typically, the dimensions of the embossed features will be at least an order of magnitude larger in cross section (e.g., at least 10, 100 or even at least 1000 times larger) than the average size of the shaped abrasive composites.

Structured abrasive articles according to the present disclosure may be secured to a support structure such, for example, a backup pad secured to a tool such as, for example, a random orbital sander. The optional attachment interface layer may be, for example an adhesive (e.g., a pressure-sensitive adhesive) layer, a double-sided adhesive tape, a loop fabric for a hook and loop attachment (e.g., for use with a backup or support pad having a hooked structure affixed thereto), a hooked structure for a hook and loop attachment (e.g., for use with a back up or support pad having a looped fabric affixed thereto), or an intermeshing attachment interface layer (e.g., mushroom type interlocking fasteners designed to mesh with a like mushroom type interlocking fastener on a backup or support pad). Further details concerning such attachment interface layers may be found, for example, in U.S. Pat. No. 5,152,917 (Pieper et al.); U.S. Pat. No. 5,254,194 (Ott); U.S. Pat. No. 5,454,844 (Hibbard et al.); and U.S. Pat. No. 5,681,217 (Hoopman et al.); and U.S. Pat. Appl. Publ. Nos. 2003/0143938 (Braunschweig et al.) and 2003/0022604 (Annen et al.).

Likewise, the second major surface of the backing may have a plurality of integrally formed hooks protruding therefrom, for example, as described in U.S. Pat. No. 5,672,186 (Chesley et al.). These hooks will then provide the engagement between the structured abrasive article and a back up pad that has a loop fabric affixed thereto.

Structured abrasive articles according to the present disclosure may be provided in any form (for example, as a sheet, belt, or disc), and be of any overall dimensions. Embossed structured abrasive discs may have any diameter, but typically have a diameter in a range of from 0.5 centimeter to 15.2 centimeters. The structured abrasive article may have slots or slits therein and may be otherwise provided with perforations.

Structured abrasive articles according to the present disclosure are generally useful for abrading a workpiece, and especially those workpieces having a hardened polymeric layer thereon. The workpiece may comprise any material and may have any form. Examples of materials include metal, metal alloys, exotic metal alloys, ceramics, painted surfaces, plastics, polymeric coatings, stone, polycrystalline silicon, wood, marble, and combinations thereof. Examples of workpieces include molded and/or shaped articles (e.g., optical lenses, automotive body panels, boat hulls, counters, and sinks), wafers, sheets, and blocks.

A lubricating fluid may be used in conjunction with the structured abrasive article during abrading operations. Examples include oils, water, and surfactant solutions in water (e.g., anionic or nonionic surfactant solutions in water).

Select Embodiments of the Present Disclosure

In a first embodiment, the present disclosure provides a structured abrasive article comprising:
  a backing having first and second opposed major surfaces;
  shaped abrasive composites secured to the first major surface, wherein the precisely shaped abrasive composites comprise abrasive grits dispersed in a binder matrix, and wherein at least some of the shaped abrasive composites independently comprise:
    a bottom surface;
    a top surface opposite and not contacting the bottom surface, wherein the top surface comprises at least one interior recessed portion;
    n sidewalls, wherein n represents an integer greater than or equal to three, wherein each one of the n sidewalls abuts both of the bottom surface and the top surface, and wherein each one of the n sidewalls abuts two other of the n sidewalls; and
    at least two cusps formed by the top surface and respective different ones of the n sidewalls, wherein the at least one interior recessed portion is closer to the bottom surface than said at least two cusps.

In a second embodiment, the present disclosure provides a structured abrasive article according to the first embodiment, wherein n is greater than or equal to 4.

In a third embodiment, the present disclosure provides a structured abrasive article according to the first embodiment, wherein n is 4 or 6.

In a fourth embodiment, the present disclosure provides a structured abrasive article according to any one of first to third embodiments, wherein at least one of the n sidewalls slopes inwardly.

In a fifth embodiment, the present disclosure provides a structured abrasive article according to any one of first to fourth embodiments, wherein at least one of the n sidewalls is planar.

In a sixth embodiment, the present disclosure provides a structured abrasive article according to any one of first to fifth embodiments, wherein the bottom surface comprises a planar surface bounded by n sides.

In a seventh embodiment, the present disclosure provides a structured abrasive article according to any one of first to sixth embodiments, wherein the shaped abrasive composites have a maximum dimension in the range of from 12 to 2000 microns.

In an eighth embodiment, the present disclosure provides a structured abrasive article according to any one of first to seventh embodiments, wherein the shaped abrasive composites comprise precisely-shaped abrasive composites.

In a ninth embodiment, the present disclosure provides a structured abrasive article according to any one of first to eighth embodiments, wherein the shaped abrasive composites are regularly spaced apart from one another.

In a tenth embodiment, the present disclosure provides a structured abrasive article according to any one of first to ninth embodiments, wherein each of the cusps is substantially equidistant from the bottom surface.

In an eleventh embodiment, the present disclosure provides a structured abrasive article according to any one of first to tenth embodiments, wherein, relative to its bottom surface, each of the shaped abrasive composites has a height, and wherein the recessed feature has a lowest point that is higher than half of the height.

In a twelfth embodiment, the present disclosure provides a structured abrasive article according to any one of first to eleventh embodiments, wherein each of the shaped abrasive composites has substantially the same size and shape.

In a thirteenth embodiment, the present disclosure provides a structured abrasive article according to any one of first to twelfth embodiments, further comprising an attachment interface layer disposed on the second major surface.

In a fourteenth embodiment, the present disclosure provides a method of abrading a workpiece, the method comprising: frictionally contacting at least a portion of the abrasive layer of the structured abrasive article of any one of the first to thirteenth embodiments with a surface of the workpiece; and moving at least one of the workpiece or the abrasive layer relative to the other to abrade at least a portion of the surface of the workpiece.

In a fifteenth embodiment, the present disclosure provides a structured abrasive article comprising:
  a backing having first and second opposed major surfaces;
  shaped abrasive composites secured to the first major surface, wherein the precisely shaped abrasive composites comprise abrasive grits dispersed in a binder matrix, and wherein at least some of the shaped abrasive composites independently comprise:
    a bottom surface;
    a top surface opposite and not contacting the bottom surface, wherein the top surface comprises at least one interior recessed portion and at least two triangular facets;
    n sidewalls, wherein n represents an integer greater than or equal to three, wherein each one of the n sidewalls abuts both of the bottom surface and the top surface, and wherein each one of the n sidewalls abuts two other of the n sidewalls, wherein each one of the at least two triangular facets, abuts a respective different one of the n sidewalls; and
    at least two cusps formed in part by at least two of said at least two triangular facets, wherein the at least one interior recessed portion is closer to the bottom surface than said at least two cusps.

In a sixteenth embodiment, the present disclosure provides a structured abrasive article according to the fifteenth embodiment, wherein n is greater than or equal to 4.

In a seventeenth embodiment, the present disclosure provides a structured abrasive article according to the fifteenth embodiment, wherein n is 4 or 6.

In an eighteenth embodiment, the present disclosure provides a structured abrasive article according to any one of the fifteenth to seventeenth embodiments, wherein at least one of the n sidewalls slopes inwardly.

In a nineteenth embodiment, the present disclosure provides a structured abrasive article according to any one of the fifteenth to eighteenth embodiments, wherein at least one of the n sidewalls is planar.

In a twentieth embodiment, the present disclosure provides a structured abrasive article according to any one of the fifteenth to nineteenth embodiments, wherein the bottom surface comprises a planar surface bounded by n sides.

In a twenty-first embodiment, the present disclosure provides a structured abrasive article according to any one of the fifteenth to twentieth embodiments, wherein the shaped abrasive composites have a maximum dimension in the range of from 12 to 2000 microns.

In a twenty-second embodiment, the present disclosure provides a structured abrasive article according to any one of the fifteenth to twenty-first embodiments, wherein the shaped abrasive composites comprise precisely-shaped abrasive composites.

In a twenty-third embodiment, the present disclosure provides a structured abrasive article according to any one of the fifteenth to twenty-second embodiments, wherein the shaped abrasive composites are regularly spaced apart from one another.

In a twenty-fourth embodiment, the present disclosure provides a structured abrasive article according to any one of the fifteenth to nineteenth embodiments, wherein the shaped abrasive composites comprise precisely-shaped abrasive composites.

In a twenty-fifth embodiment, the present disclosure provides a structured abrasive article according to any one of seventeenth to twenty-fourth embodiments, wherein the shaped abrasive composites are regularly spaced apart from one another.

In a twenty-sixth embodiment, the present disclosure provides a structured abrasive article according to any one of fifteenth to twenty-fourth embodiments, wherein each of the shaped abrasive composites has substantially the same size and shape.

In a twenty-seventh embodiment, the present disclosure provides a structured abrasive article according to any one of fifteenth to twenty-sixth embodiments, further comprising an attachment interface layer disposed on the second major surface.

In a twenty-eighth embodiment, the present disclosure provides a method of abrading a workpiece, the method comprising: frictionally contacting at least a portion of the abrasive layer of a structured abrasive article according to structured abrasive article according to any one of the fifteenth to twenty-seventh embodiments with a surface of the workpiece; and moving at least one of the workpiece or the abrasive layer relative to the other to abrade at least a portion of the surface of the workpiece.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

Table of abbreviations used in the examples:

| ABBREVIATION | DESCRIPTION |
| --- | --- |
| PI | acylphosphine oxide photoinitiator, commercially available under the trade designation LUCERIN TPO-L from BASF Corporation, Florham Park, New Jersey |
| A174 | gamma-methacryloxypropyltrimethoxysilane, obtained as A174 from Crompton Corporation, Middlebury, Connecticut |
| DSP | anionic polyester dispersant, obtained as SOLPLUS D520 from Lubrizol Advanced Materials of Cleveland, Ohio |
| SR351 | trimethylolpropane triacrylate, obtained as SR351 from Sartomer USA LLC, Exton, Pennsylvania |
| OX50 | silicon dioxide, obtained as AEROSIL OX50 from Degussa Corporation, Parsippany, New Jersey |
| WA2500 | white fused alumina with particle size $d_{50} = 5.60 +/- 0.50$ microns, obtained as WA 2500 from Fujimi Corporation, Wilsonville, Oregon |

Example 1

A structured abrasive article was prepared by combining, in order, 23.8 parts SR351, 0.54 parts DSP, 1.47 parts A174, 0.81 parts PI, 2.9 parts OX50, and 70.5 parts WA2500 and stirring with a high-shear mixer. A polypropylene tool having recesses to provide an array of shaped abrasive composites (shaped generally as the precisely-shaped abrasive composite shown in FIGS. 2A and 2B) with a 5.8-mil (0.1472 mm) pitch. Each shaped cavity opening (corresponding to the base) was 4.0 mils×4.0 mils (0.1027 mm×0.1027 mm) and each wall rose at an 82 degree angle to a height of 3.3 mils (0.0831 mm) above the base. The top face of each shaped abrasive composite had two orthogonal v-shaped cuts centrally disposed at right angles from corner-to-corner across the top face (providing side cusps in the abrasive composite), each cut being 0.75 mils (0.019 mm) deep and furrowed at 110 degrees. The abrasive slurry was coated (using a putty knife) into the cavities of the polypropylene tool to achieve a coating weight of about 1.1 g/24 in² (71 g/m²). The filled tool was contacted by a 3-mil polyester film backing having a EAA primer coating and irradiated by ultraviolet light from two D bulbs (Fusion Systems, Gaithersburg, Md.) operating at 120 watts/cm. The polypropylene tool was removed from the composition yielding a structured abrasive article. A PSA attachment layer was laminated to the backing and 1.25 in (3.175 cm) diameter abrasive discs were cut from the lamination for testing.

Comparative Example A

Comparative Example A was prepared identically to Example 1 of U.S. Pat. No. 8,425,278 B2 (Culler et al.), which had cusps located at corners formed by intersecting sidewalls instead of along the sidewall faces as in Example 1.

Figure 8:
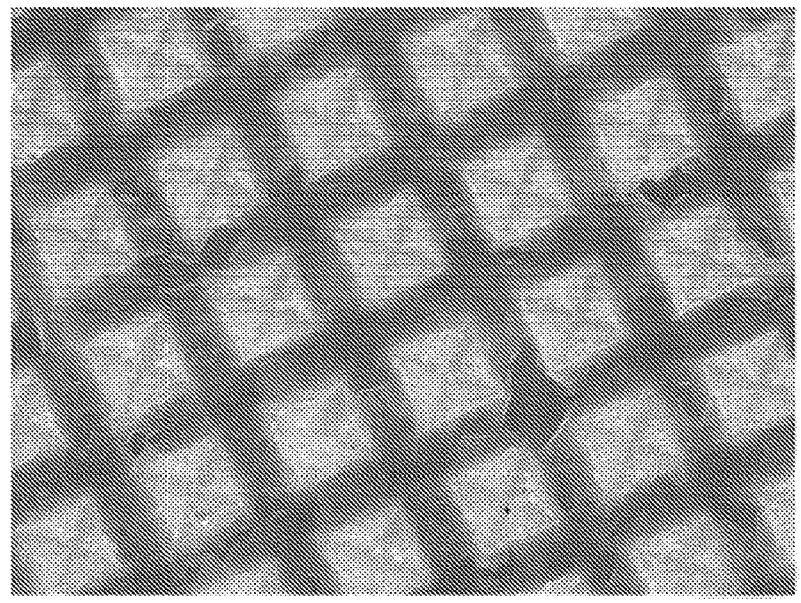
FIG. 8 is a digital micrograph of the structured abrasive disc prepared in Example 1.
Figure 9:
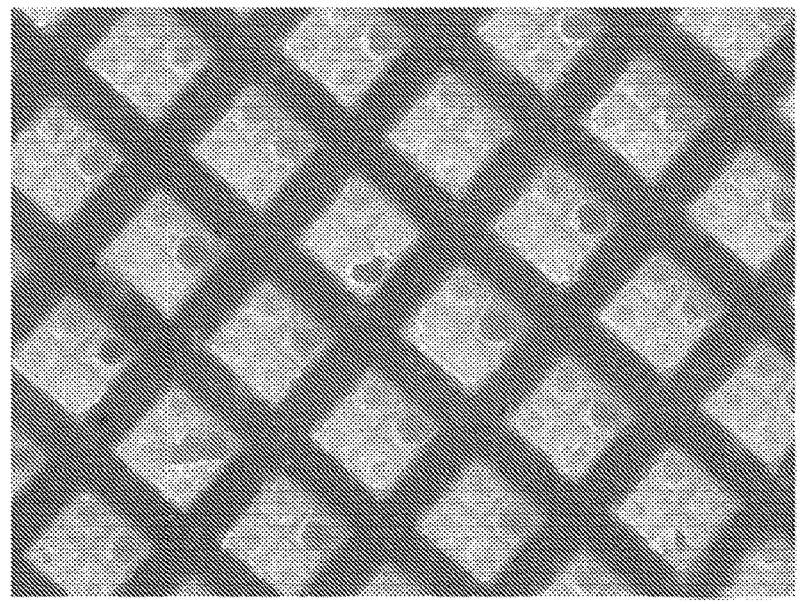
FIG. 9 is a digital micrograph of the structured abrasive disc prepared in Comparative Example A.

Test discs from Example 1 and Comparative Example A were examined under 400× magnification using a KEYENCE VHX-1000 digital microscope. A representative area of the disc of Example 1 is shown in FIG. 8, and a representative area of the structured abrasive disc of Comparative Example A is shown in FIG. 9. The darker, blotchy features in FIG. 9 are voids caused by imperfect fill of the tool cavities.

All cited references, patents, or patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A structured abrasive article comprising:
   a backing having first and second opposed major surfaces;
   shaped abrasive composites secured to the first major surface, wherein the precisely shaped abrasive composites comprise abrasive grits dispersed in a binder matrix, and wherein at least some of the shaped abrasive composites independently comprise:
   a bottom surface;
   a top surface opposite and not contacting the bottom surface, wherein the top surface comprises at least one interior recessed portion;
   n sidewalls, wherein n represents an integer greater than or equal to three, wherein each one of the n sidewalls abuts both of the bottom surface and the top surface, and wherein each one of the n sidewalls abuts two other of the n sidewalls; and
   at least two cusps formed by the top surface and respective different single ones of the n sidewalls, and each sidewall has at least one cusp, wherein the at least one interior recessed portion is closer to the bottom surface than said at least two cusps.

2. The structured abrasive article of claim 1, wherein n is 4 or 6.

3. The structured abrasive article of claim 1, wherein at least one of the n sidewalls slopes inwardly.

4. The structured abrasive article of claim 1, wherein at least one of the n sidewalls is planar.

5. The structured abrasive article of claim 1, wherein the bottom surface comprises a planar surface bounded by n sides.

6. The structured abrasive article of claim 1, wherein the shaped abrasive composites comprise precisely-shaped abrasive composites.

7. The structured abrasive article of claim 1, wherein the shaped abrasive composites are regularly spaced apart from one another.

8. The structured abrasive article of claim 1, wherein each of the cusps is substantially equidistant from the bottom surface.

9. The structured abrasive article of claim 1, wherein, relative to its bottom surface, each of the shaped abrasive composites has a height, and wherein the recessed feature has a lowest point that is higher than half of the height.

* * * * *